(12) United States Patent
Kawanishi et al.

(10) Patent No.: US 10,875,507 B2
(45) Date of Patent: Dec. 29, 2020

(54) VEHICLE

(71) Applicant: TOYOTA JIDOSHA KABUSHIKI KAISHA, Toyota (JP)

(72) Inventors: Hiroshi Kawanishi, Nisshin (JP); Yoshinori Morita, Toyota (JP); Eiji Ito, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/547,721

(22) Filed: Aug. 22, 2019

(65) Prior Publication Data
US 2020/0114884 A1   Apr. 16, 2020

(30) Foreign Application Priority Data

Oct. 10, 2018   (JP) .................................. 2018-192046

(51) Int. Cl.
*B60T 7/10* (2006.01)
*B60T 1/00* (2006.01)
*B62D 25/20* (2006.01)

(52) U.S. Cl.
CPC .............. *B60T 7/102* (2013.01); *B60T 1/005* (2013.01); *B62D 25/20* (2013.01)

(58) Field of Classification Search
CPC .......... B60T 1/005; B60T 7/102; B60T 14/18; F16H 63/006; F16H 63/3416; B62D 25/20; B62D 25/2072; B62D 35/02
See application file for complete search history.

(56) References Cited

U.S. PATENT DOCUMENTS

| | | | |
|---|---|---|---|
| 2007/0209903 A1* | 9/2007 | Hayashi | ................. B60T 7/104 192/219.6 |
| 2013/0020171 A1 | 1/2013 | Jang et al. | |
| 2015/0034450 A1* | 2/2015 | Spooner | ............. F16H 63/3458 192/220.2 |
| 2018/0135753 A1* | 5/2018 | Tateno | ................ F16H 63/3466 |

FOREIGN PATENT DOCUMENTS

| | | |
|---|---|---|
| CN | 102889379 A | 1/2013 |
| CN | 108068780 A | 5/2018 |
| JP | 2017-032119 A | 2/2017 |
| JP | 2017-166647 A | 9/2017 |

* cited by examiner

*Primary Examiner* — David R Morris
*Assistant Examiner* — Lori Wu
(74) *Attorney, Agent, or Firm* — Oliff PLC

(57) ABSTRACT

A vehicle includes: a floor panel; an under cover disposed below the floor panel in the vehicle; a parking lock mechanism, disposed between the floor panel and the under cover, switching, using an actuator, a locked state for constraining rotation of a wheel and an unlocked state for not constraining rotation of the wheel; and a parking lock manual releasing mechanism, disposed between the floor panel and the parking lock mechanism, switching, when the parking lock mechanism is in the locked state, the state of the parking lock mechanism to the unlocked state on a basis of manual operation of an operation portion. Further, the under cover includes a visual recognition hole for viewing the operation portion.

4 Claims, 5 Drawing Sheets

VEHICLE

CROSS-REFERENCE TO RELATED APPLICATION(S)

The present application claims priority to and incorporates by reference the entire contents of Japanese Patent Application No. 2018-192046 filed in Japan on Oct. 10, 2018.

BACKGROUND

The present disclosure relates to a vehicle.

In the related art, there has been known a parking lock mechanism capable of switching between a locked state for constraining rotation of a wheel and an unlocked state for not constraining rotation of a wheel (e.g., Japanese laid-open Patent Publication No. 2017-166647). In the parking lock mechanism, a detent plate is driven by an actuator so that the locked state and the unlocked state are switched. Further, the parking lock mechanism is provided with a parking lock manual releasing mechanism for compulsorily switching to the unlocked state by manual operation. With this arrangement, even in the case where the actuator becomes inoperable, the parking lock mechanism can be switched to the unlocked state by the parking lock manual releasing mechanism.

SUMMARY

There is a need for providing a vehicle capable of improving operability of a parking lock manual releasing mechanism.

According to an embodiment, a vehicle includes: a floor panel; an under cover disposed below the floor panel in the vehicle; a parking lock mechanism, disposed between the floor panel and the under cover, switching, using an actuator, a locked state for constraining rotation of a wheel and an unlocked state for not constraining rotation of the wheel; and a parking lock manual releasing mechanism, disposed between the floor panel and the parking lock mechanism, switching, when the parking lock mechanism is in the locked state, the state of the parking lock mechanism to the unlocked state on a basis of manual operation of an operation portion. Further, the under cover includes a visual recognition hole for viewing the operation portion.

DETAILED DESCRIPTION

In the related art, depending on the installation location of the parking lock manual releasing mechanism, visibility and accessibility of an operation portion of the parking lock manual releasing mechanism, which is to be manually operated, may be impaired, and operability of the parking lock manual releasing mechanism may be degraded.

Hereinafter, an embodiment of a vehicle according to the present disclosure will be described. Note that the present disclosure is not limited by the present embodiment.

Figure 1:
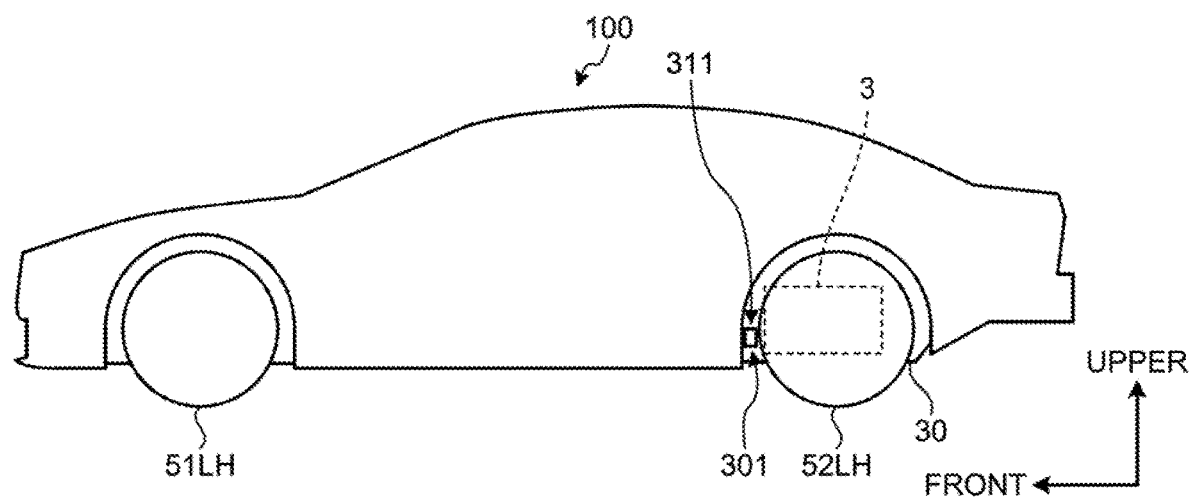
FIG. 1 is a schematic view illustrating a vehicle according to an embodiment.

FIG. 1 is a schematic view illustrating a vehicle 100 according to the embodiment. As illustrated in FIG. 1, in the vehicle 100 according to the embodiment, a transaxle 3 is mounted in the space, which is at the rear of the vehicle, between a floor panel 60 (see FIG. 5) constituting a floor of an interior room covered with a body and the like and an under cover 30 disposed below the floor panel 60 in the vehicle. It is needless to say that the upper part of the vehicle 100, which is above the under cover 30, is covered with the body, and the space mentioned above is covered with the body. In the vehicle 100 according to the embodiment, a left rear wheel 52LH and a right rear wheel (not illustrated) are drive wheels to which driving force is transmitted from a power source (not illustrated) via the transaxle 3, and a left front wheel 51LH and a right front wheel (not illustrated) are non-drive wheels. Note that an internal combustion engine such as a gasoline engine and a diesel engine, a motor, or the like can be used as the power source.

Further, in the vehicle 100 according to the embodiment, a parking lock mechanism 1 (see, for example, FIG. 2) to be described later, which is capable of switching, using an actuator, between a locked state for constraining rotation of a wheel and an unlocked state for not constraining rotation of a wheel, is provided in a case of the transaxle 3. Furthermore, a parking lock manual releasing mechanism 2 to be described later, which is capable of switching the parking lock mechanism 1 to the unlocked state on the basis of manual operation of an operation portion when the parking lock mechanism 1 is in the locked state, is provided in the space between the floor panel 60 and the under cover 30 to be adjacent to the transaxle 3. Note that a part of the parking lock manual releasing mechanism 2 may be disposed in the case of the transaxle 3, and at least the operation portion is disposed outside the case of the transaxle 3.

Figure 2:
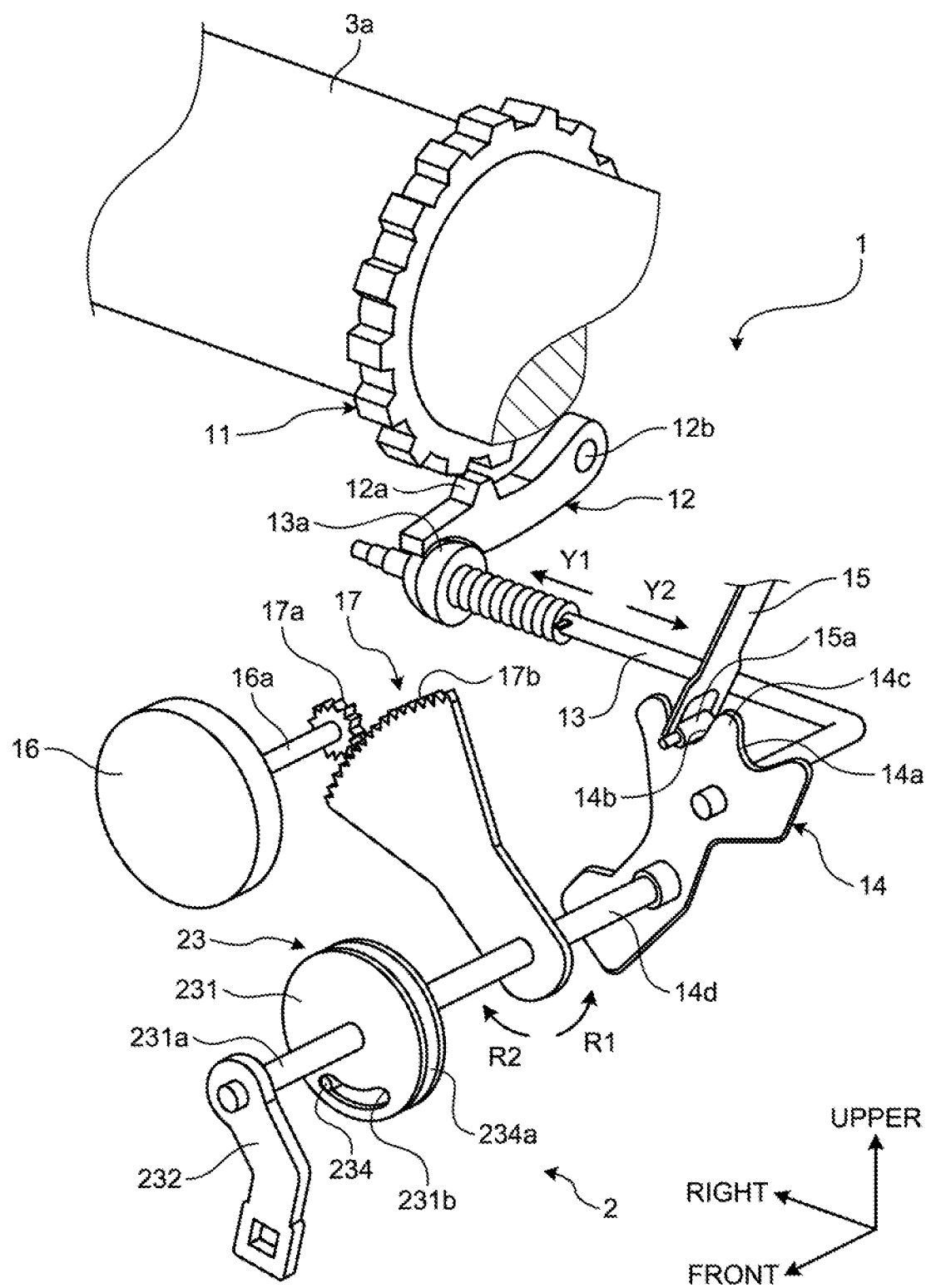
FIG. 2 is a schematic configuration view illustrating a parking lock mechanism.
Figure 3:
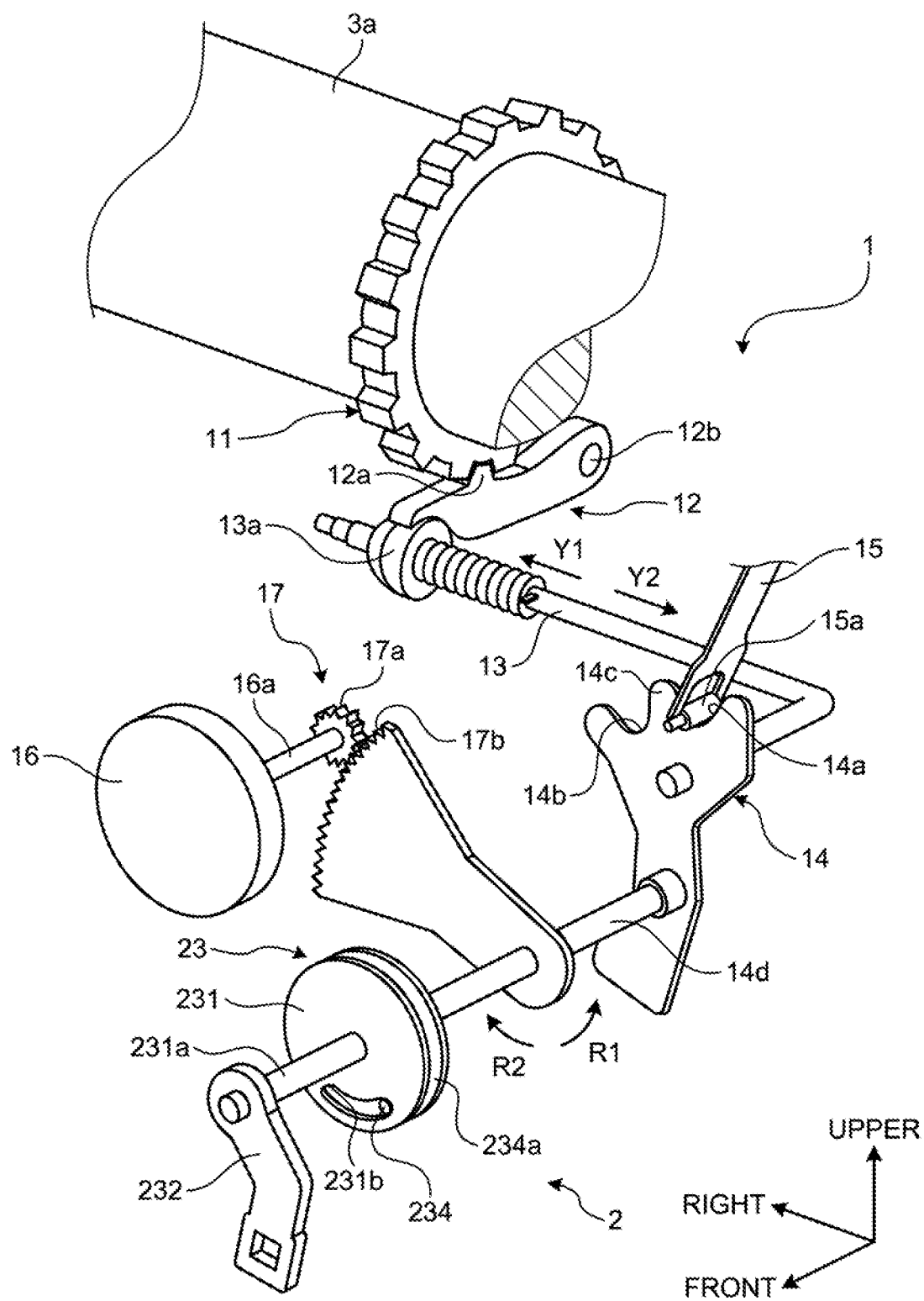
FIG. 3 is a view of the parking lock mechanism, which is switched to a locked state.

Next, a schematic configuration of the parking lock mechanism 1 will be described with reference to FIGS. 2 and 3. The parking lock mechanism 1 is switchable between the locked state (P position) that makes a power transmission shaft 3a non-rotatable and the unlocked state (NP position) that makes the power transmission shaft 3a rotatable. Note that FIG. 2 illustrates the unlocked state, and FIG. 3 illustrates the locked state. In addition, the power transmission shaft 3a is provided in, for example, an automatic transmission (not illustrated) installed in the transaxle 3 of the vehicle 100, and transmits power for traveling the vehicle.

As illustrated in FIGS. 2 and 3, the parking lock mechanism 1 includes a parking gear 11, a parking pawl 12, a parking rod 13, a detent plate 14, a detent spring 15, an actuator 16, and a deceleration mechanism 17.

The parking gear 11 is provided on the outer periphery of the power transmission shaft 3a, and rotates integrally with the power transmission shaft 3a.

The parking pawl 12 is disposed in the vicinity of the lower side of the parking gear 11, and has a protrusion 12a that can be meshed with the parking gear 11. The parking pawl 12 is rotatable around a spindle 12b, and is biased to the side away from the parking gear 11 by a return spring (not illustrated).

One end of the parking rod 13 is connected to the detent plate 14, and the other end thereof is provided with a cam 13a. The cam 13a is disposed on the lower side opposite to the spindle 12b of the parking pawl 12. The parking rod 13 moves in an axial direction when the detent plate 14 rotates.

The detent plate 14 is provided integrally with a shaft 14d, and rotates according to the shaft 14d. The detent plate 14 has a P dip 14a and an NP dip 14b formed along the rotational direction with a peak 14c interposed therebetween.

The detent spring 15 is, for example, a plate spring, which is provided to hold the position of the detent plate 14. A roller 15a is rotatably provided at the tip end of the detent spring 15, and the roller 15a is engaged with one of the P dip 14a and the NP dip 14b.

The actuator 16 is connected to the shaft 14d via the deceleration mechanism 17. The actuator 16 rotates the shaft 14d and the detent plate 14 in response to a control signal from an electronic control unit (not illustrated).

The deceleration mechanism 17 reduces output of the actuator 16, and transmits the output to the shaft 14d. The deceleration mechanism 17 includes a small-diameter gear 17a provided on an output shaft 16a of the actuator 16, and a fan-shaped large-diameter gear 17b provided on the shaft 14d. The small-diameter gear 17a rotates integrally with the output shaft 16a, and the large-diameter gear 17b rotates integrally with the shaft 14d. The small-diameter gear 17a and the large-diameter gear 17b are meshed with each other.

Next, operation of the parking lock mechanism 1 will be described. First, in the unlocked state illustrated in FIG. 2, the large-diameter gear 17b is rotated by the actuator 16 in the R1 direction when switching to the locked state is requested from the electronic control unit. The shaft 14d and the detent plate 14 are rotated in the R1 direction accordingly, and the parking rod 13 is moved in the Y1 direction. Accordingly, the parking pawl 12 is pushed up against the biasing force of the return spring by the cam 13a of the parking rod 13, and the protrusion 12a of the parking pawl 12 is meshed with the parking gear 11. As a result, the power transmission shaft 3a enters the non-rotatable locked state as illustrated in FIG. 3. At this time, the roller 15a of the detent spring 15 is engaged with the P dip 14a of the detent plate 14, whereby the position of the detent plate 14 is held and kept in the locked state.

Further, in the locked state illustrated in FIG. 3, the large-diameter gear 17b is rotated by the actuator 16 in the R2 direction when switching to the unlocked state is requested from the electronic control unit. The shaft 14d and the detent plate 14 are rotated in the R2 direction accordingly, and the parking rod 13 is moved in the Y2 direction. Accordingly, the large diameter portion of the cam 13a retracts from the lower area of the parking pawl 12, whereby the parking pawl 12 is pushed down by the biasing force of the return spring, and the protrusion 12a of the parking pawl 12 is disengaged from the parking gear 11. As a result, the power transmission shaft 3a enters the rotatable unlocked state as illustrated in FIG. 2. At this time, the roller 15a of the detent spring 15 is engaged with the NP dip 14b of the detent plate 14, whereby the position of the detent plate 14 is held and kept in the unlocked state.

Next, the parking lock manual releasing mechanism 2 for releasing the parking lock mechanism 1 with manual operation will be described. The parking lock manual releasing mechanism 2 is provided to manually and compulsorily switch the parking lock mechanism 1 in the locked state to the unlocked state. Note that a situation where it is necessary to manually switch the parking lock mechanism 1 to the unlocked state is, for example, failure of the actuator 16, or battery exhaustion. The parking lock manual releasing mechanism 2 includes an idling mechanism 23. The idling mechanism 23 includes a main body 231, a lever 232 that is an operation portion, a compression coil spring (not illustrated), and a contact portion 234.

The main body 231 is, for example, a circular plate, and a shaft 231a is integrally provided at the center thereof. The shaft 231a is disposed coaxially with the shaft 14d, and the main body 231 is rotatable around the shaft 231a. Further, the main body 231 is rotatable relative to the shaft 14d, and rotates between a normal position and a working position. Furthermore, a cutout portion 231b is formed in the main body 231 to extend along the rotational direction.

A base end of the lever 232 is attached to the shaft 231a, and the lever 232 rotates integrally with the main body 231 around the shaft 231a. Further, the tip end of the lever 232 is disposed below the rotation center (shaft 231a) of the main body 231 and the lever 232, and is disposed to face substantially downward. Note that the lever 232 is disposed outside the case of the transaxle 3.

The compression coil spring mentioned above presses the lever 232 such that the main body 231 is positioned at the normal position.

As illustrated in FIGS. 2 and 3, the contact portion 234 is provided on a plate 234a, and is formed to project from the plate 234a toward the main body 231. The contact portion 234 is disposed in the cutout portion 231b of the main body 231. The plate 234a is provided to rotate integrally with the shaft 14d. That is, the contact portion 234 is connected to the shaft 14d via the plate 234a, and rotates integrally with the shaft 14d.

In such an idling mechanism 23, the contact portion 234 moves along the cutout portion 231b when the shaft 14d and the detent plate 14 are rotated by the actuator 16 and the parking lock mechanism 1 is switched between the locked state and the unlocked state. The contact portion 234 is positioned on one end side of the cutout portion 231b as illustrated in FIG. 2 when the parking lock mechanism 1 is in the unlocked state, and the contact portion 234 is positioned on the other end side of the cutout portion 231b as illustrated in FIG. 3 when the parking lock mechanism 1 is in the locked state. Therefore, when the main body 231 is at the normal position, the locked state and the unlocked state can be switched without being subject to interference caused by the idling mechanism 23.

When the parking lock mechanism 1 is in the locked state, the idling mechanism 23 transmits, at the time when the lever 232 is manually operated and the main body 231 moves from the normal position to the working position, the operation force to the shaft 14d so that the detent plate 14 rotates in the R2 direction.

Moreover, when the parking lock mechanism 1 is in the unlocked state, the idling mechanism 23 does not transmit the operation force to the shaft 14d even if the lever 232 is manually operated and the main body 231 moves from the normal position to the working position. This is because, as illustrated in FIG. 2, the contact portion 234 is positioned on the one end side of the cutout portion 231b when it is in the unlocked state so that, even when the main body 231 rotates in the R2 direction, the shaft 14d is not rotated while the other end of the cutout portion 231b approaches the contact portion 234.

In the vehicle 100 according to the embodiment, the parking lock manual releasing mechanism 2 is installed in the space formed between the floor panel 60 and the under cover 30. Accordingly, for example, visibility of the lever 232 and accessibility to the lever 232 at the time of manually releasing the parking lock mechanism 1 from outside the vehicle using the parking lock manual releasing mechanism 2 are impaired due to the floor panel 60 and the under cover 30.

Figure 4:
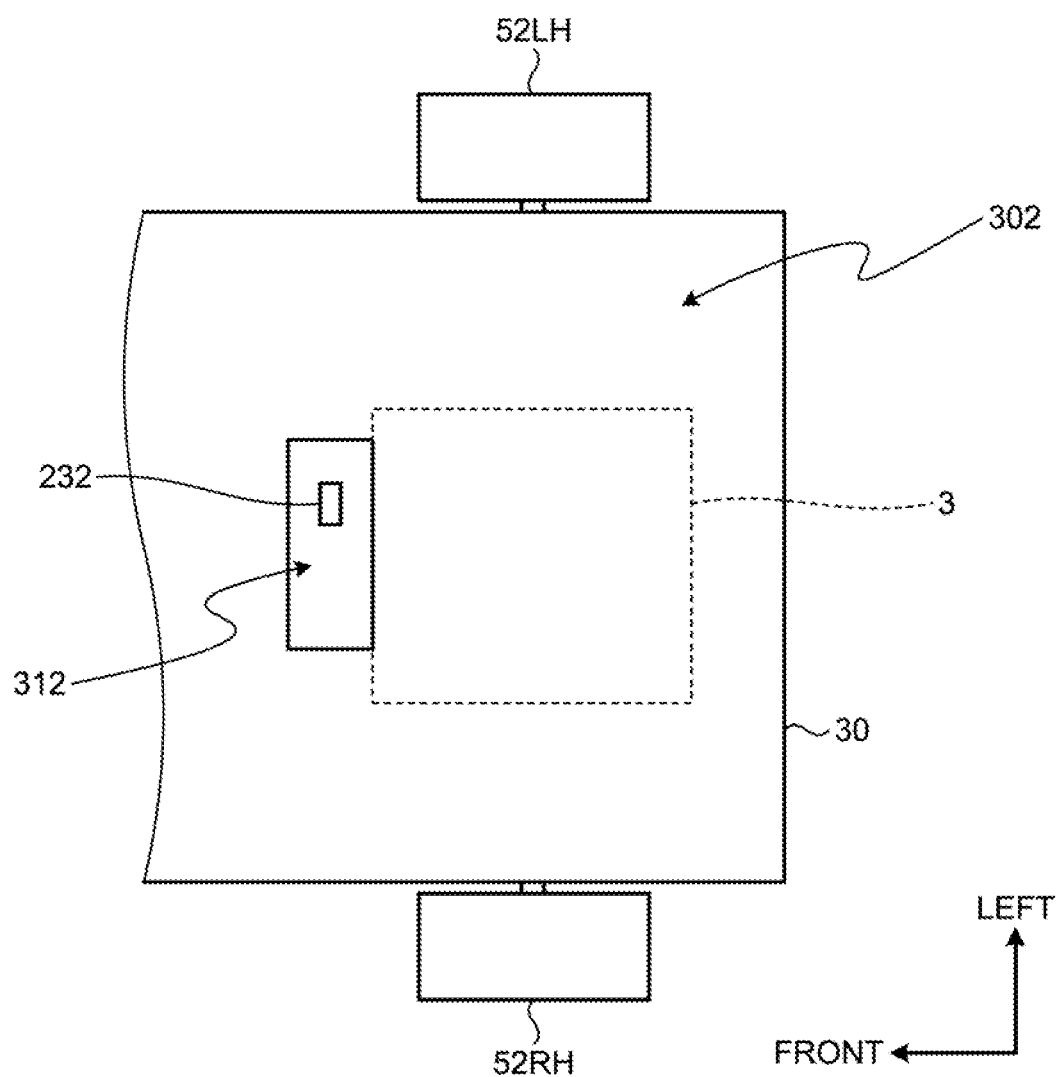
FIG. 4 is a view of a bottom surface of an under cover viewed from below the vehicle.

In view of the above, as illustrated in FIG. 4, the vehicle 100 according to the embodiment has a working hole 312 for allowing the operator to manually operate the lever 232 from outside the vehicle, which is provided at a position on the front side of the transaxle 3 in a bottom surface 302 of the under cover 30 and below the lever 232 of the parking lock manual releasing mechanism 2. The working hole 312 connects a socket 40b of a tool 40 to be described later with the lever 232 of the parking lock manual releasing mechanism 2 to secure a size with which manual operation for causing the lever 232 to rotate can be performed.

Furthermore, in the vehicle 100 according to the embodiment, a visual recognition hole (viewing hole) 311 for allowing the lever 232 of the parking lock manual releasing mechanism 2 to be viewed from outside the vehicle is provided in the side surface of the under cover 30 in the vehicle-width direction. Specifically, in the vehicle-width direction, the visual recognition hole 311 is provided in the side surface of the under cover 30 located on the side same as the side on which the shaft 231a connected to the lever 232 of the parking lock manual releasing mechanism 2 is located with respect to the center in the vehicle-width direction. In other words, in the vehicle 100 according to the embodiment, the visual recognition hole 311 is provided on a left side surface 301 of the under cover 30. Accordingly, the distance between the visual recognition hole 311 and the lever 232 of the parking lock manual releasing mechanism 2 can be shortened, and the visibility of the lever 232 at the time when the operator outside the vehicle looks into the visual recognition hole 311 to view the lever 232 can be enhanced.

Moreover, ini the vehicle 100 according to the embodiment, the visual recognition hole 311 is positioned in front of a left rear wheel 52LH on the left side surface 301 of the under cover 30 in the vehicle longitudinal direction, as illustrated in FIG. 1. Accordingly, the operator can view the lever 232 from the visual recognition hole 311 in the state where the left rear wheel 52LH is attached to the vehicle 100, whereby it becomes unnecessary to detach the left rear wheel 52LH from the vehicle 100, and workability can be improved at the time of manually releasing the parking lock mechanism 1 using the parking lock manual releasing mechanism 2.

Figure 5:
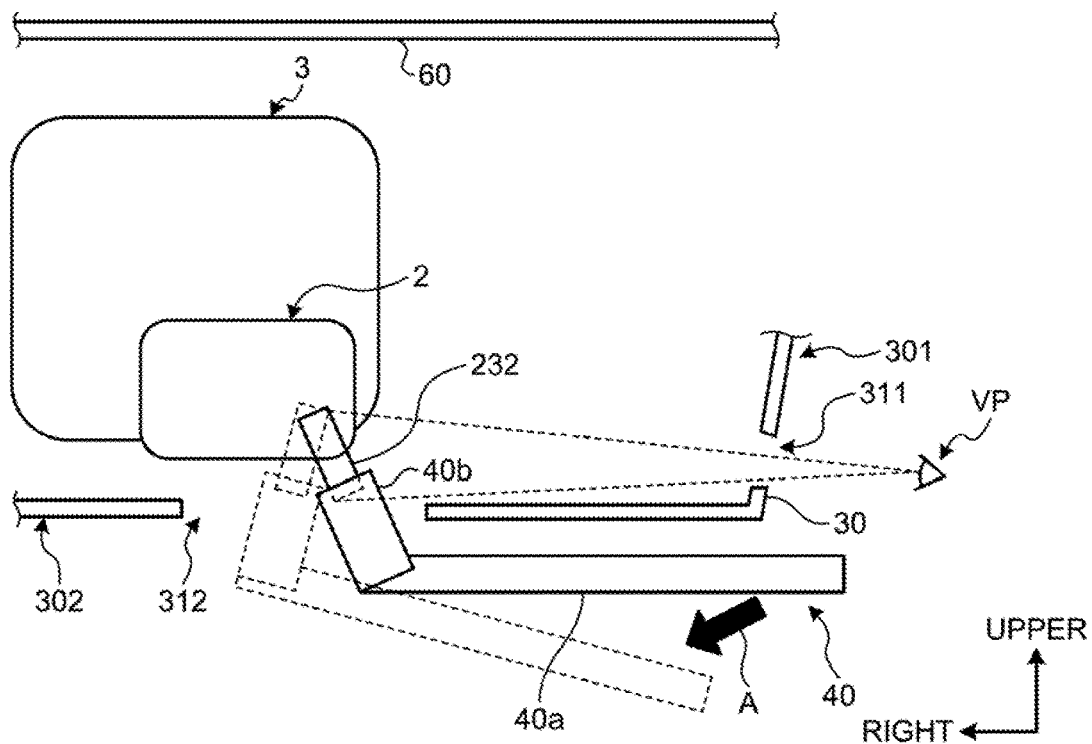
FIG. 5 is a view illustrating an manual operation of a parking lock manual releasing mechanism.

Next, operation of the parking lock manual releasing mechanism 2 at the time of manually and compulsorily switching the parking lock mechanism 1 in the locked state to the unlocked state will be described. FIG. 5 is a view illustrating manual operation of the parking lock manual releasing mechanism 2. Note that a reference sign "VP" in FIG. 5 indicates a viewpoint of the operator. Here, the case where the operator manually operates the lever 232 of the parking lock manual releasing mechanism 2 from outside the vehicle using the tool 40 will be described. Note that the tool 40 is, for example, an L-shaped box wrench, and includes the cylindrical socket 40b connectable to the lever 232, and a rod-shaped gripper 40a to be gripped by the operator, which is connected to the base end of the socket 40b.

As illustrated in FIG. 5, when the parking lock mechanism 1 is manually released by the parking lock manual releasing mechanism 2, the operator outside the vehicle inserts the socket 40b of the tool 40 into the working hole 312 provided in the bottom surface 302 of the under cover 30 while viewing the lever 232 of the parking lock manual releasing mechanism 2 from the visual recognition hole 311, whereby the socket 40b and the lever 232 are connected to each other (state in which the lever 232 and the tool 40 are illustrated by solid lines in FIG. 5). In this state, the operator then pushes out the gripper 40a of the tool 40 so that the lever 232 connected to the socket 40b of the tool 40 rotates around the shaft 231a (see, for example, FIG. 3) clockwise in FIG. 5 (state in which the lever 232 and the tool 40 are illustrated by broken lines in FIG. 5). At this time, in the idling mechanism 23 (see FIG. 3, etc.) of the parking lock manual releasing mechanism 2, the lever 232 rotates against the biasing force of a compression coil spring 233. Accordingly, the main body 231 of the idling mechanism 23 rotates from the normal position to the working position. At this time, the cutout portion 231b of the main body 231 abuts on and is engaged with the contact portion 234, and the detent plate 14 and the shaft 14d of the parking lock mechanism 1 rotate in the R2 direction (see, for example, FIG. 3) together with the main body 231. Accordingly, the parking lock mechanism 1 is switched from the locked state to the unlocked state.

In the vehicle 100 according to the embodiment, the under cover 30 has the visual recognition hole 311 for viewing the lever 232 of the parking lock manual releasing mechanism 2, and the working hole 312 for manually operating the lever 232. Therefore, the visibility of the lever 232 and the accessibility to the lever 232 can be improved at the time when the operator manually releases, using the parking lock manual releasing mechanism 2, the parking lock mechanism 1 from outside the vehicle.

In a case where the operator gets under the vehicle 100 and manually operates the lever 232 while viewing the lever 232 from the working hole 312 provided in the bottom surface 302 of the under cover 30, it may be difficult for the operator to get under the vehicle 100 due to the condition of the road surface (e.g., gravel, puddle), or the clothes of the operator may be soiled to soil the interior of the vehicle when getting inside the vehicle 100 thereafter. Meanwhile, in the vehicle 100 according to the embodiment, the visual recognition hole 311 is provided in the side surface (left side surface) of the under cover 30 in the vehicle-width direction, the operator is not required to get under the vehicle 100 to manually operate the lever 232 while viewing the lever 232 of the parking lock manual releasing mechanism 2 from the working hole 312. Therefore, an occurrence of the problems as described above can be suppressed.

Incidentally, although the visual recognition hole 311 for viewing the lever 232 of the parking lock manual releasing mechanism 2 and the working hole 312 for manually operating the lever 232 are separately provided in the under cover 30 in the vehicle 100 according to the embodiment, the visual recognition hole 311 and the working hole 312 may be combined into one hole. Moreover, two or more visual recognition holes 311 and working holes 312 may be provided.

In the case where the visual recognition hole 311 and the working hole 312 are separately provided in the under cover 30, the visual recognition hole 311 is preferably made smaller than the working hole 312. The working hole 312 needs to have a certain size to connect the socket 40b of the tool 40 with the lever 232 of the parking lock manual releasing mechanism 2 and to manually rotate the lever 232. Meanwhile, while the visibility is improved as the size of the visual recognition hole 311 becomes larger, gravel, mud or the like tends to enter the inside of the under cover 30 from the visual recognition hole 311. In view of the above, by making the visual recognition hole 311 smaller than the working hole 312, it becomes possible to suppress gravel, mud or the like intruding from the visual recognition hole 311 into the inside of the under cover 30 compared with the case where the visual recognition hole 311 is made larger than the working hole 312. Furthermore, by minimizing the size of the visual recognition hole 311 and the working hole 312, an influence on the performance such as aerodynamics can be reduced.

Figure 6:
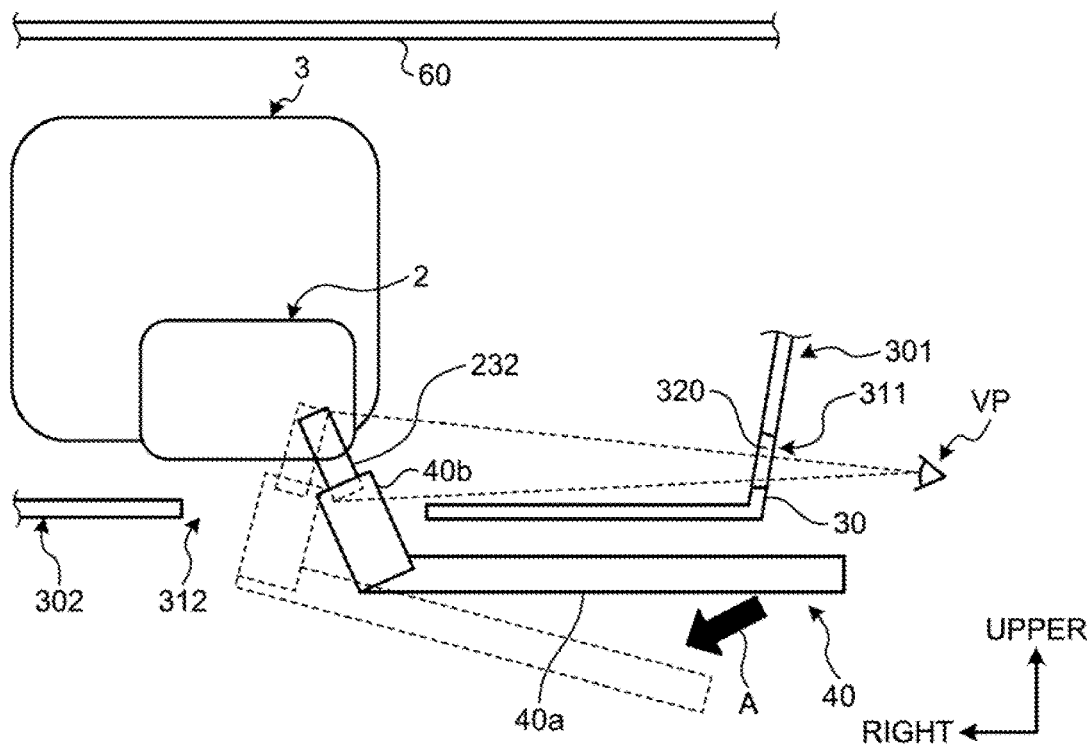
FIG. 6 is a view illustrating a case where a transparent member is fitted in a visual recognition hole.

In addition, in the vehicle 100 according to the embodiment, a transparent member 320 made of a transparent resin material, such as polycarbonate and acrylic, may be fitted in the visual recognition hole 311 provided in the left side surface 301 of the under cover 30, for example, thereby sealing (closing) the visual recognition hole 311 with the transparent member 320, as illustrated in FIG. 6. Accordingly, it becomes possible to suppress gravel or mud intruding from the visual recognition hole 311 into the inside of the under cover 30, and to suppress the visual recognition hole 311 affecting the performance, such as aerodynamics, while visibility of the lever 232 of the parking lock manual releasing mechanism 2 from outside the vehicle is secured.

In the vehicle according to the present disclosure, manual operation can be performed while the operation portion is viewed from the visual recognition hole provided in the under cover, whereby operability of the parking lock manual releasing mechanism can be improved.

According to an embodiment, an operator may not be required to get under the vehicle to view the operation portion, whereby workability can be improved.

According to an embodiment, an operator outside the vehicle can manually operate, using a tool, the operation portion from the working hole provided in the bottom surface of the under cover while viewing the operation portion of the parking lock manual releasing mechanism from the visual recognition hole.

According to an embodiment, it becomes possible to suppress gravel, mud or the like intruding from the visual recognition hole into the inside of the under cover, and to suppress the visual recognition hole affecting the performance, such as aerodynamics, while visibility of the operation portion is secured.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
   a floor panel;
   an under cover disposed below the floor panel in the vehicle;
   a parking lock mechanism, disposed between the floor panel and the under cover, configured to switch, using an actuator, a locked state for constraining rotation of a wheel and an unlocked state for not constraining rotation of the wheel; and
   a parking lock manual releasing mechanism, disposed between the floor panel and the parking lock mechanism, configured to, when the parking lock mechanism is in the locked state, switch the state of the parking lock mechanism to the unlocked state on a basis of manual operation of an operation portion, wherein
   the under cover includes a visual recognition hole for viewing the operation portion.

2. The vehicle according to claim 1, wherein the visual recognition hole is provided in a side surface of the under cover in a vehicle-width direction.

3. The vehicle according to claim 1, wherein a working hole for manually operating the operation portion is provided in a bottom surface of the under cover.

4. The vehicle according to claim 1, wherein the visual recognition hole is sealed with a transparent member.

* * * * *